United States Patent [19]

Anderson

[11] Patent Number: 4,502,557
[45] Date of Patent: Mar. 5, 1985

[54] SPEED CONTROL APPARATUS FOR POWERED TRAILER

[76] Inventor: Rogers H. Anderson, 10501 Bloomington Freeway, Bloomington, Minn. 55420

[21] Appl. No.: 429,970
[22] Filed: Sep. 30, 1982
[51] Int. Cl.³ .............................................. B60D 1/14
[52] U.S. Cl. .................................................. 180/14.2
[58] Field of Search ..................... 180/14.1, 14.2, 14.3, 180/14.6; 280/476 R, 476 A, 489, 497, 428, 432

[56] References Cited

U.S. PATENT DOCUMENTS

3,035,653 5/1962 Steepe ................................. 180/14.2
3,578,096 5/1971 Pearson .............................. 180/14.6
4,231,442 11/1980 Birkeholm .......................... 180/14.1

Primary Examiner—Joseph F. Peters, Jr.
Assistant Examiner—D. Lynn Fugate
Attorney, Agent, or Firm—Kinney & Lange

[57] ABSTRACT

A powered trailer for aiding a powered vehicle in moving a load trailer is selectively connected to the vehicle by a tongue assembly. A sensing device mounted on the tongue assembly senses the position and motion of the vehicle relative to the powered trailer. Trailer engine speed and brake control devices control the engine and brakes of the powered trailer dependent on signals from the sensing device so that the engine and brakes of the powered trailer operate in coordination with those on the vehicle.

7 Claims, 9 Drawing Figures

SPEED CONTROL APPARATUS FOR POWERED TRAILER

REFERENCE TO CO-PENDING APPLICATION

Reference is hereby made to the co-pending patent application filed on even date herewith entitled "Tongue Assembly for Powered Trailers".

BACKGROUND OF THE INVENTION

1. Field of the Invention

The present invention relates to auxiliary powered units for assisting vehicles in moving load trailers. In particular, the present invention relates to an apparatus for controlling the speed of the powered trailer dependent on the position and motion of the vehicle relative to the powered trailer.

2. Description of the Prior Art

Increased concerns about efficient energy consumption have led to the production of smaller and lighter automobiles. Such vehicles attain greater fuel efficiencies than previous models by having smaller engines, smaller bodies and many components made of lightweight materials. Because these lighter vehicles have smaller engines, their ability to pull trailers of any substantial load is greatly diminished. In addition, because such vehicles are so lightweight, substantial stress is created on a vehicle's frame when a heavy trailer is hitched thereto. Therefore, when a trailer of substantial load is to be moved by a small automobile, a booster source of power with means for preventing the weight of the trailer from being transferred completely onto the automobile frame is desired.

One approach for providing an supplemental source of power to pull a trailer is to place a booster engine on the trailer itself. This concept is shown in U.S. Pat. No. 2,630,871, granted to Simpkins on Mar. 10, 1953 and U.S. Pat. No. 4,185,710, granted to Kronogard on Jan. 29, 1980. The devices of these patents do not overcome the problem of stress caused by excess tongue weight on the vehicle frame. They do provide a booster motor to aid in pulling the trailer, but the devices of these patents increase rather than lighten the trailer weight placed on the vehicle.

A more satisfactory method for assisting a vehicle in pulling a heavy load trailer is to provide an auxiliary booster trailer between the vehicle and the load trailer. This concept is shown in U.S. Pat. No. 2,153,468, granted to Heyn on Apr. 4, 1939 and U.S. Pat. No. 3,695,373, granted to Bostrom on Oct. 3, 1972. The Heyn Patent shows a powered booster trailer to provide more pulling power and aid in distributing the weight of the load between the various axles of the vehicle, booster trailer and load trailer. No details are provided as to how the motor on the Heyn trailer is controlled or coordinated with the motor on the vehicle. The Bostrum device discloses an auxiliary trailer with a booster motor, but is mainly concerned with a mechanism for changing the gears in a manned drive unit and the auxiliary trailer simultaneously. This mechanism is a complex hydraulic connection system between the drive unit and auxiliary trailer gears so that the auxiliary trailer gears are controlled in dependence upon the drive unit gears.

None of these prior art patents discloses an auxiliary powered trailer wherein the powered trailer is provided with a tongue assembly between it and the vehicle which substantially eliminates the transfer of load weight from the powered trailer and load trailer to the powered vehicle or which is suitable for use with small automobiles. The control means disclosed in these patents for controlling the operation of the engines on the powered trailers are somewhat complicated and generally operably connected to the engine or transmission of the powered vehicle. In addition, the safety problems inherent in having a driverless powered vehicle on the highway is not addressed by any of the prior devices.

SUMMARY OF THE INVENTION

The powered trailer comprises a main frame with a pair of wheels movably supporting the main frame. An engine is mounted on the main frame and an automatic transmission means transmits mechanical power from the engine to the wheels. A tongue assembly connects the powered trailer adjacent a forward end of its main frame to the vehicle. The tongue assembly has a first member adapted to be connected to the vehicle and a second member connected to the powered trailer, with the first member being slidable in first and second opposite directions with respect to the second member. The position and motion of the first member relative to the second member is dependent upon the position and motion of the vehicle relative to the powered trailer. A position sensing means senses the position and motion of the first member relative to the second member and, dependent upon the position and motion detected by the sensing means, an engine speed control means controls the speed of the engine on the powered trailer. Hitch means selectively connect the powered trailer adjacent a rearward end of its main frame to the load trailer.

The present invention provides a relatively simple and durable means for controlling the movements of a powered trailer connected to a powered vehicle. The speed of the powered trailer's engine is controlled by means for sensing the position and motion of the vehicle relative to the powered trailer. The position sensing means operates automatically to permit the powered trailer to simultaneously change its pulling or pushing power in coordination with the vehicle to ease the strain on the vehicle.

DETAILED DESCRIPTION OF THE PREFERRED EMBODIMENTS

Figure 1:
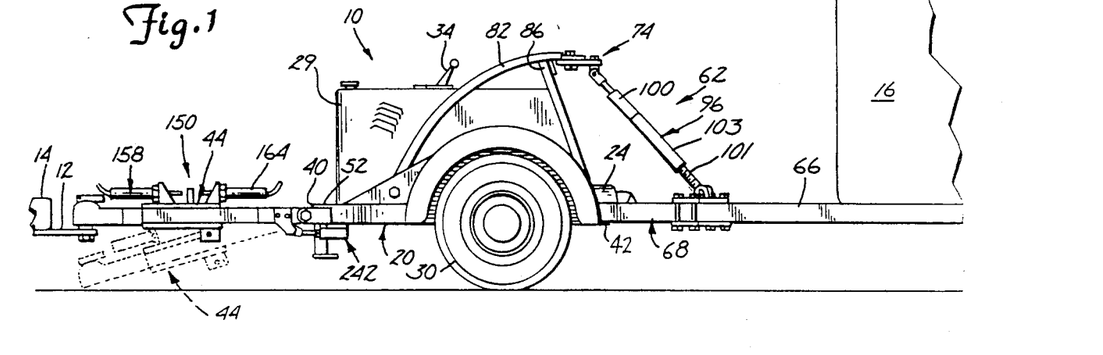
FIG. 1 (Sheet 1) is a side elevational view of the powered trailer of the present invention.

A powered trailer 10 is shown in FIG. 1 (Sheet 1) hitched between a trailer hitch 12 on a bumper 14 of a powered vehicle (not shown) and a load trailer 16. The powered vehicle can be any prime mover suitable for motive operation, such as an automobile or truck. The load trailer 16 can be any type of trailer, such as, for example, a boat trailer, a house trailer or a horse trailer. The powered trailer 10 is provided between the powered vehicle and load trailer 16 to aid the powered vehicle in moving the load trailer 16 in both forward and reverse directions (to the left or to the right, respectively, as viewed in FIGS. 1 and 2 (Sheet 1)).

Figure 2:
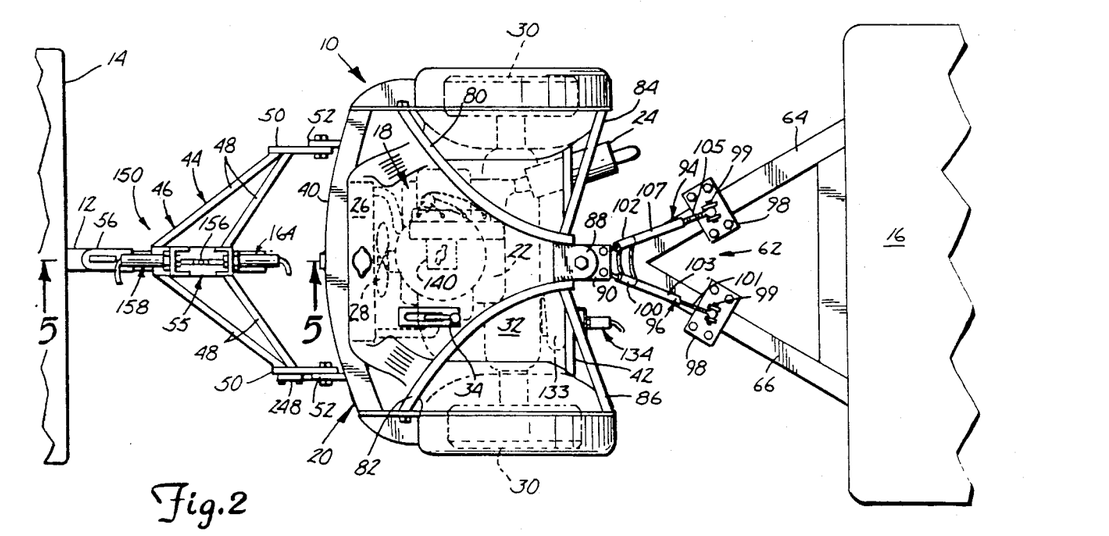
FIG. 2 (Sheet 1) is a top plan view of the powered trailer.

To assist the powered vehicle 10 in moving the load trailer 16, the powered trailer 10 is provided with an engine 18. The engine 18 is mounted on a main frame 20 of the powered trailer 10. As best shown in FIG. 2, the engine 18 is preferably an internal combustion engine having the standard features thereof, including a main engine block 22, an exhaust and muffler system 24 and a water cooling system with a radiator 26 and a fan 28. While the following description will be based upon the use of an internal combustion-type engine on the powered trailer 10, it is understood that any type of engine (such as an electric motor) would be suitable. As shown, a cowling or cover 29 is provided to protect the engine 18 and other mechanical portions of the powered trailer 10 from the elements.

A pair of wheels 30, 30 movably support the main frame 20. The wheels 30 are drive wheels, being driven by the engine 18 through means for transmitting mechanical power from the engine 18 to the wheels 30, such as a hydrostatic transmission or an automatic transmisson, as shown generally at 32. As on any automobile or truck, the transmission 32 can disengage the wheels 30 from the driving power of the engine 18 by suitable shifting control means, such as a gear shift lever 34. Normally, the gear shift lever 34 is located in the cab or on the instrument panel of a powered vehicle. However, since the powered trailer 10 is an unmanned or "driverless" vehicle, the shift lever 34 is shown adjacent the engine 18 and transmission 32. Of course, suitable control means can also be provided to permit remote operator control of the engagement and disengagement of the automatic transmission 32 with the engine 18 to control when power is applied to drive the wheels 30 and move the powered trailer 10.

The main frame 20 of the powered trailer 10 has a forward end 40 and a rearward end 42. A forward tongue assembly 44 is pivotally mounted on the main frame 20 adjacent the forward end 40 thereof. The tongue assembly 44 includes a yoke frame 46 having a central portion 55 with a plurality of frame members 48 extending rearwardly therefrom. As shown, the frame members 48 are connected to a pair of generally horizontally spaced legs 50, 50. The legs 50 extend rearwardly from the yoke frame 46 for pivotal mounting to a pair of ears 52, 52 extending forwardly adjacent the sides and forward end 40 of the main frame 20.

Figure 3:
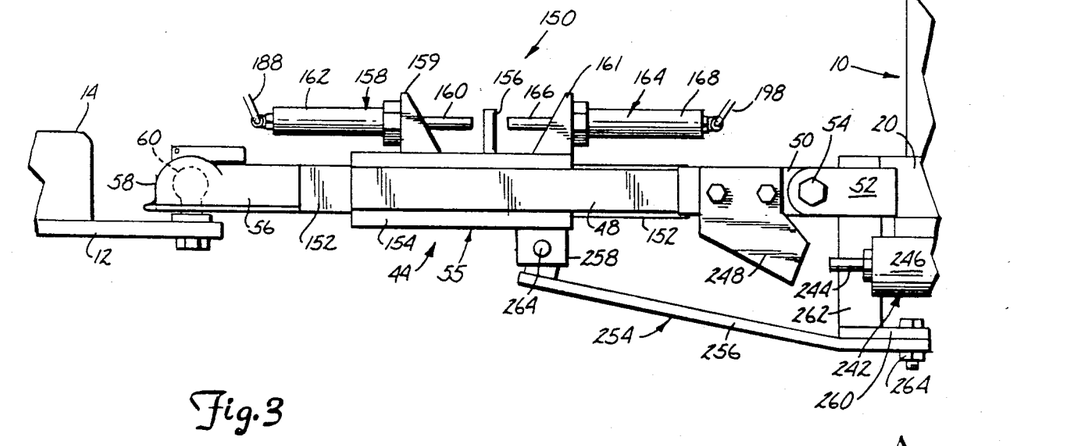
FIG. 3 (Sheet 2) is an enlarged side view of the tongue assembly of the powered trailer.
Figure 4:
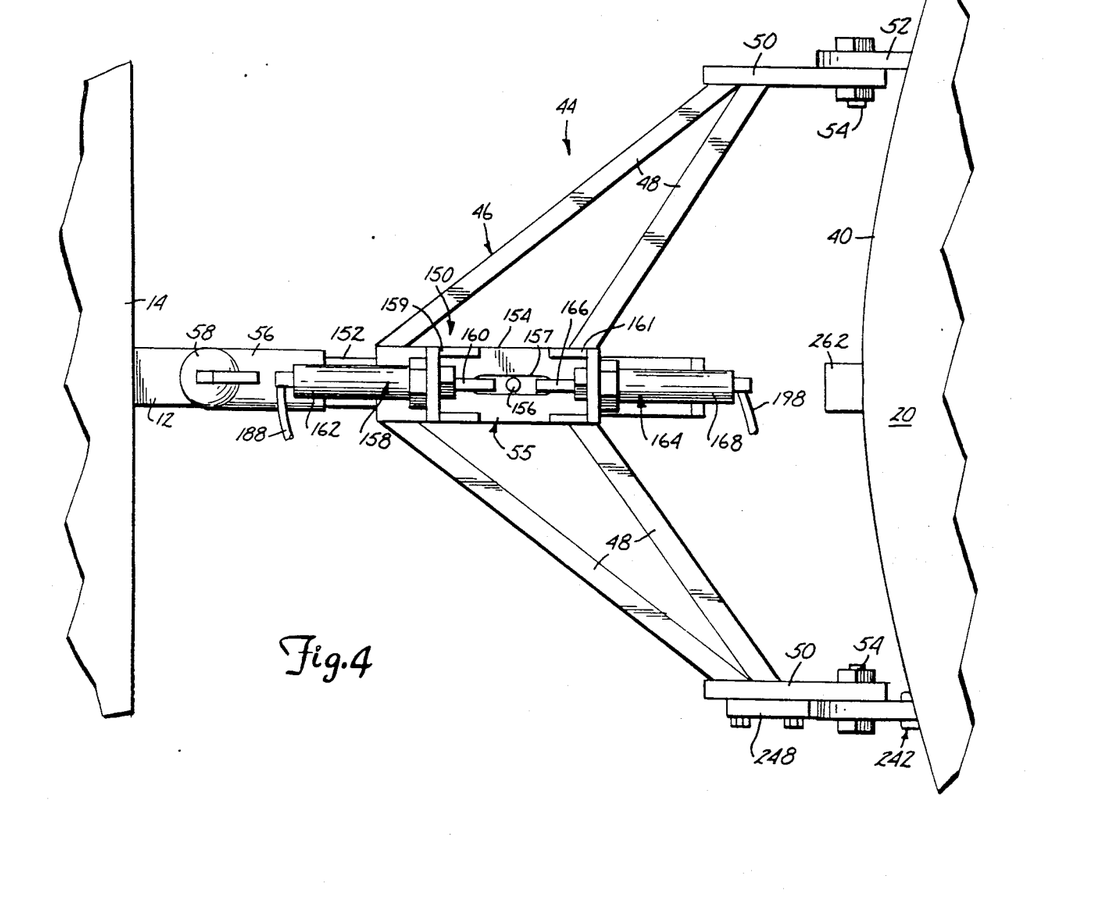
FIG. 4 (Sheet 2) is an enlarged top plan view of the tongue assembly.

The tongue assembly 44 is in further detail shown in FIGS. 3 and 4 (Sheet 2). There it can be seen that the legs 50 are pivotally mounted to the ears 52 of the main frame 20 on a common generally horizontal axis by suitable fastening means, such as pivot pins 54. Thus, the tongue assembly 44 is pivotal with respect to the main frame 20 from an upper operating position to a lower stop position (shown in phantom in FIG. 1).

Extending forwardly from the central portion 55 of the yoke frame 46 is a hitch tongue 56 for selectively connecting the powered trailer 10 to the powered vehicle. Conventionally, the hitch tongue 56 has a circular cap portion 58 which is secured about a ball hitch 60 on the trailer hitch 12 of the powered vehicle as shown in FIG. 3. The tongue assembly 44 can thus pivot about a substantially vertical axis defined by the ball hitch 60.

Because the tongue assembly 44 is pivotally mounted to the powered trailer 10, only a portion of the physical weight of the tongue assembly 44 is carried by the powered vehicle. When a load trailer 16 is secured to the rearward end 42 of the powered trailer as shown in FIGS. 1 and 2, the pivotal mounting of the tongue assembly 44 also acts to prevent the transfer of the weight of the load trailer 16 to the powered vehicle. Therefore, all of the weight of the load trailer 16 is supported by the powered trailer 10 and not transferred to the powered vehicle. As for the weight of the powered trailer 10, the only weight that is carried by the vehicle is a portion of the weight of the tongue assembly 44. The rest of the weight of the powered trailer 10 is carried by itself.

Figure 5:
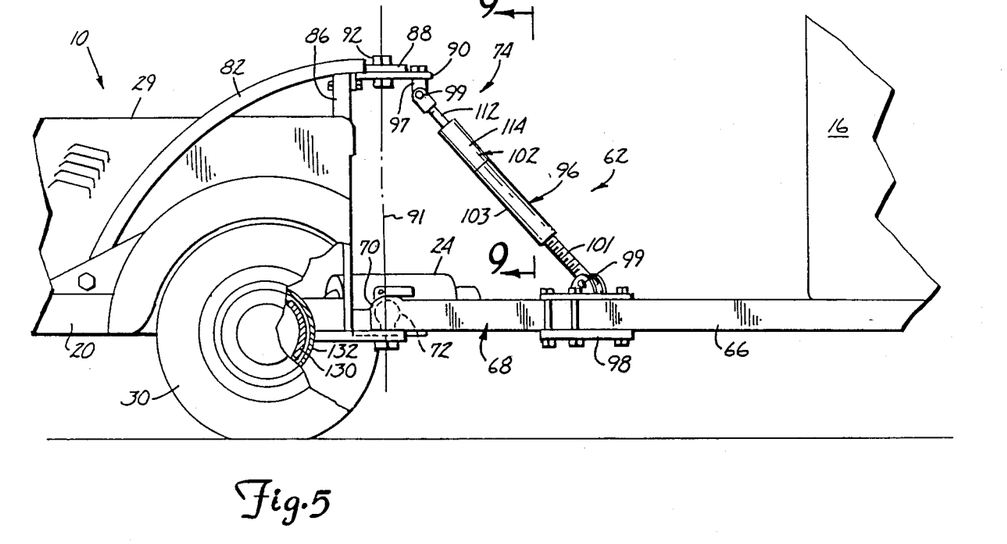
FIG. 5 (Sheet 3) is an enlarged side elevational view of the rearward end of the powered trailer with some parts broken away and some parts shown in section.

As shown in FIGS. 1, 2 and 5 (Sheet 3), hitch means 62 are provided adjacent the rearward end 42 of the main frame 20 for connecting the powered trailer 10 to the load trailer 16. Conventionally, the load trailer 16 will have frame members 64 and 66 extending forwardly therefrom and joined at their forward ends to define a lead tongue assembly 68. As best shown in FIG. 5), the forward end of the lead tongue assembly 68 has a circular cap portion 70 which is selectively secured about a ball hitch 72 secured on a hitch plate 73 on the main frame 20. The lead tongue assembly 68 can thus pivot about a substantially vertical axis defined by the ball hitch 72.

The hitch means 62 of the powered trailer 10 also includes a hitch frame 74 extending rearwardly from the powered trailer 10 over the lead tongue assembly 68. The hitch frame 74 is pivotally secured to the frame members 64 and 66 and pivotally mounted to the main frame 20 to permit movement of the load trailer 16 relative to the powered trailer 10. The hitch frame 74 includes upper frame members 80, 82, 84 and 86 of the main frame 20, which are all secured to a pivot plate 88 positioned generally over the ball hitch 72. An upper swivel plate 90 is pivotally mounted to the pivot plate 88 on a substantially vertical pivot axis by suitable means, such as a pivot pin 92. For effective turning of the load trailer 16 relative to the powered trailer 10, the vertical axes of the pivot pin 92 and the ball hitch 72 are colinear to define a substantially vertical turning axis 91 (as shown in FIG. 5).

Figure 6:
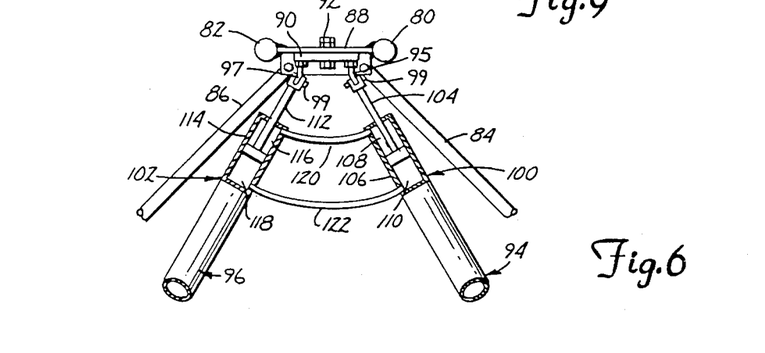
FIG. 6 (Sheet 3) is an enlarged rear elevational view of an upper portion of the rearward end of the powered trailer with some parts shown in section.

As best shown in FIG. 6 (Sheet 3), a first support arm 94 is pivotally secured on a substantially horizontal axis at its upper end to a first ear 95 mounted on the swivel plate 90. Similarly, a second support arm 96 is pivotally secured on a separate substantially horizontal axis at its upper end to a second ear 97 mounted on the swivel plate 90. Lower ends of the support arms 94 and 96 are pivotally secured to the first and second frame members 64 and 66, respectively, of the lead tongue assembly 68 along separate substantially horizontal axes. The arms 94 and 96 are secured to the frame members 64 and 66 by suitable fastening means, such as a fastening brackets 98, and both ends of the arms 94 and 96 are pivotally mounted to their respective mounting means by suitable pivot pins 99.

A part of each support arm consists of an extensible portion, such as double-acting fluid cylinders 100 and 102, respectively. The fluid cylinder 100 of arm 94 has a piston rod 104 and a cylinder portion 106, with the cylinder portion having a piston rod retraction chamber 108 and a piston rod extension chamber 110. Similarly, the fluid cylinder 102 of arm 96 has a piston rod 112 and a cylinder portion 114, with the cylinder portion 114 having a piston rod retraction chamber 116 and a piston rod extension chamber 118. The retraction chambers 108 and 116 of the fluid cylinders 100 and 102 and are sealably connected by a top flow line 120. The extension chambers 110 and 118 of the fluid cylinders 100 and 102 are sealably connected by a bottom flow line 122. Thus, as the piston rod of one fluid cylinder is forced into its respective cylinder portion, the pressures in the various chambers are equalized by the the piston rod of the other fluid cylinder being forced an equal distance out of its respective cylinder portion. Since the cylinders 100 and 102 are operably connected in this manner, controlled lateral pivoting of the load trailer 16 with respect to the powered trailer 10 is permitted as the trailers are moved over terrain which is laterally uneven. Thus, while the load trailer 16 is securely connected to the powered trailer 10, lateral pivoting is allowed and dampened by the unique hitch frame 74. While the extensible portions of the support arms have been described in terms of fluid cylinders, mechanical means are also suitable for attaining the inversely matched extension and retraction movements of the support arms.

The length of each support arm is separately adjustable to readily adapt the hitch frame 74 to different types of load trailer lead tongue assemblies. As shown, support arm 94 has an externally threaded member 101 which is adjustable in an internally threaded member 103. Similarly, support arm 96 has an externally threaded member 105 which is adjustable in an internally threaded member 107. Thus, in those cases where the lead tongue assembly of the load trailer consists of only a single central member (not shown), the lengths of the support arms 94 and 96 can be changed to permit their attachment to the single central member in a longitudinally overlapping or series relationship.

The load trailer 16 is selectively connected to the main frame 20 of the powered trailer 10 by what is essentially a three-part hitch consisting of the hitch means 62 and hitch frame 74. The tongue weight of the load trailer 16 is thus placed on the main frame 20. The powered trailer 10, in turn, is selectively connected to the powered vehicle by the tongue assembly 44. Because the tongue assembly 44 is pivotally mounted on a generally horizontal axis to the forward end 40 of the main frame 20, the tongue weight placed on the powered vehicle by the combination of the powered trailer 10 and load trailer 16 is relatively small. The weight of the trailers 10 and 16 is not passed to the powered vehicle; rather, all of the weight of the load trailer 16, and nearly all of the weight of the powered trailer 10, is supported by the powered trailer 10. This arrangement allows a small vehicle to pull a load trailer 16 of substantial weight without placing excessive tongue weight on the vehicle.

Figure 7:
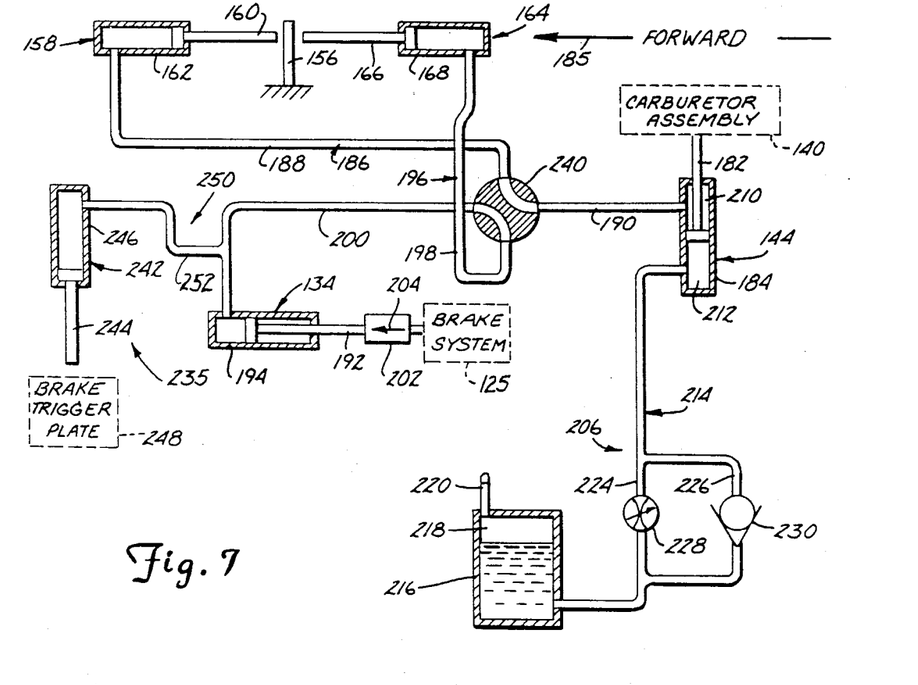
FIG. 7 (Sheet 4) is a schematic view of the hydraulic system on the powered trailer when the powered trailer is operated to move forwardly (to the left as in FIG. 1).
Figure 8:
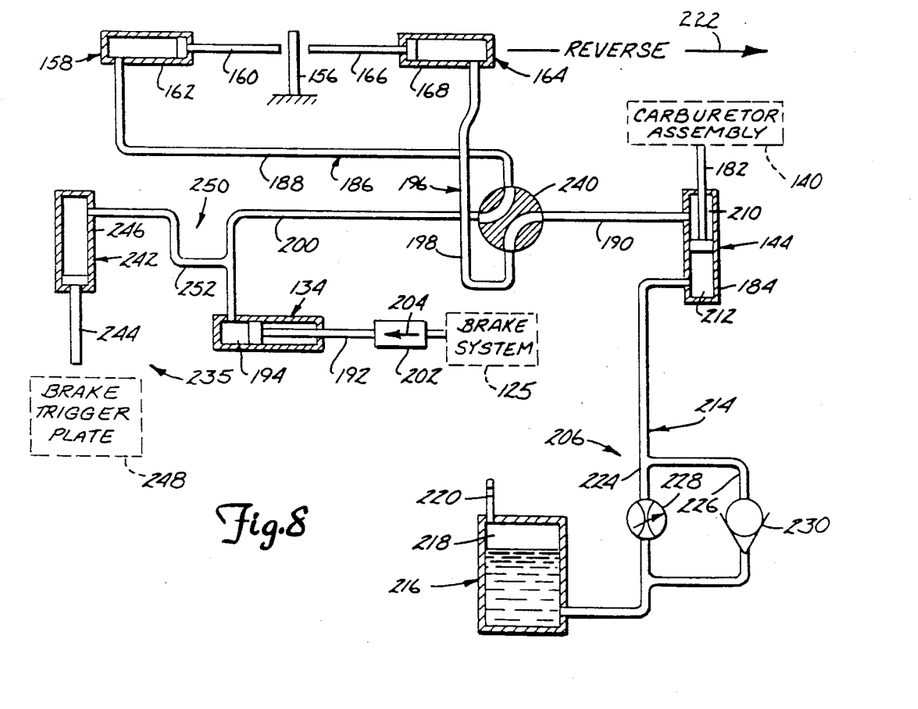
FIG. 8 (Sheet 4) is a schematic view of the hydraulic system on the powered trailer when the powered trailer is operated to move rearwardly (to the right as in FIG. 1).

Not only is the powered vehicle 10 provided with an engine 18, but it also has braking means to slow or stop the powered trailer's movement. As is conventional with road vehicles, the braking means operates to limit rotation of the powered trailer's wheels 30. On the powered trailer 10 of the present invention, the braking means or brake system 125 (FIGS. 7 and 8 (Sheet 4)) can be either disc brake or conventional shoe brake systems. A portion of a shoe brake system is shown on the wheels 30 in FIG. 5. In a conventional manner, the powered trailer is slowed by forcing a braking shoe 130 against an annular wear plate 132. The braking shoes 130 of the brake system 125 of the powered trailer 10 are operated by conventional fluid pressure means, shown generally as cylinder drum 133 in FIG. 2. The brake system 125 is activated by a hydraulic brake actuator 134 which is operably connected to the cylinder drum 133, as shown in FIGS. 2, 7 and 8.

When the engine 18 on the load trailer 10 is an internal combustion engine, the speed of the engine 18 is controlled by a standard carburetor assembly 140 on the engine 18. As shown in FIGS. 7 and 8, the carburetor assembly 140 is operably connected to a hydraulic carburetor actuator 144. Activation of the carburetor actuator 144 thus controls the acceleration and deceleration of the engine 18.

Position sensing means 150 on the tongue assembly 44 controls the operations of the hydraulic brake actuator 134 and hydraulic carburetor actuator 144. A first inner member 152 of the tongue actuator 44 is adapted to be connected to the powered vehicle by the hitch tongue 56. The central portion 55 of the tongue assembly 44 has a second outer member 154 which is fixedly secured to the frame members 48, as best shown in FIG. 4. The first member 152 is slidable in a telescoping manner with respect to the second member 154 in a first direction (to the left, as viewed in FIGS. 1–4 and 9 (Sheet 3)) and in a second, opposite direction (to the right, as viewed in FIGS. 1–4 and 9). Since the first member 152 is connected to the powered vehicle and the second member 154 is not, the position and motion of the first member 152 relative to the second member 154 is dependent upon the position and motion of the powered vehicle relative to the powered trailer 10.

A control pin 156 is fixedly mounted on the first member 152 and slides in a longitudinal slot 157 in the second member 154 when the first member 152 slides with respect to the second member 154. A first hydraulic actuator 158 has a piston rod 160 and a cylinder portion 162, with its cylinder portion 162 being fixedly mounted on the second member 154 by a mounting bracket 159. The first actuator 158 is positioned such that its piston rod 160 extends in direction to engage the control pin 156 when the control pin 156 moves in the first direction in the slot 157. Thus, when the first member 152 slides in the first direction relative to the second member 154, the control pin 156 pushes the piston rod 160 into the cylinder portion 162 of the first actuator 158.

A second actuator 164 is also mounted on the second member 154 adjacent the control pin 156. The second actuator 164 has a piston rod 166 and a cylinder portion 168 with its cylinder portion 168 being fixedly mounted on the second member 154 by a mounting bracket 161. The second actuator 164 is positioned such that its piston rod 166 extends in direction to engage the control pin 156 when it moves in the second direction in the slot 157. Thus, when the first member 152 slides in the second direction relative to the second member 154, the control pin 156 pushes the piston rod 166 into the cylinder portion 168 of the second actuator 164.

Figure 9:
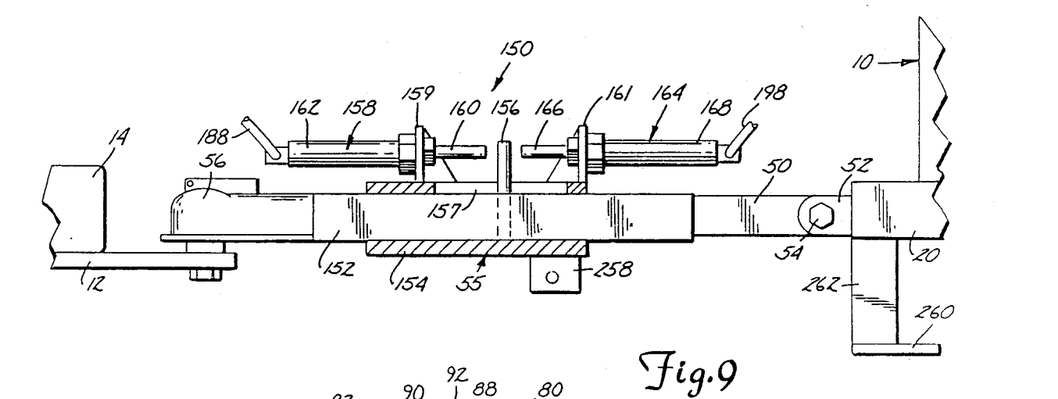
FIG. 9 (Sheet 3) is a an enlarged side elevational view of the tongue assembly with some parts shown in section.

Thus, as shown and described, movement or motion of the first member 152 relative to the second member 154 of the tongue assembly 44 pushes the piston rod of either the first actuator or second actuator (depending upon the direction of motion) into its respective cylinder portion. This position sensing means 150 (as best shown in FIG. 9), (which includes the first and second members 152 and 154 and the first and second actuators 158 and 164), senses the position and motion of the first member 152 relative to the second member 154. Movement of the powered trailer 10 is thus controlled by the position sensing means 150, which is operably connected to the engine 18 and the brake system 125.

The speed of the engine 18 is controlled dependent upon the position and motion of the first member 152 relative to the second member 154. The hydraulic carburetor actuator 144 has a piston rod 182 and a cylinder portion 184, with the piston rod 182 being operably connected to the carburetor assembly 140. Movement of the piston rod 182 of the carburetor actuator 144 into its respective cylinder portion 184 activates the carburetor assembly 140 to accelerate the engine 18. Motion of the piston rod 182 away from the cylinder portion 184 decelerates the engine 18.

When the powered trailer 10 is to be operated in a first forward direction (as indicated by forward arrow 185 in FIG. 7), the cylinder portion 162 of the first actuator 158 is sealably connected to the cylinder portion 184 of the carburetor actuator 144. These cylinder portions 162 and 144 are connected by a first fluid hydraulic connection means 186, which include a first flow line 188 and a second flow line 190. Thus, movement of the piston rod 160 of the first actuator 158 into its respective cylinder portion 162 forces hydraulic fluid through the first and second flow lines 188 and 190 to the cylinder portion 184 of the carburetor actuator 144 to move its respective piston rod 182 into the cylinder portion 184. This activates the carburetor assembly 140 to accelerate the engine 18. The movement of the piston rod 160 is caused by the control pin 156 moving in the first forward direction with the first member 152. Such motion is caused when the powered vehicle accelerates, pulling the first member 152 with it while the inertia of the second member 154 and the powered trailer 10 cause them to lag slightly behind. The control pin 156 pushes the piston rod 160 of the first actuator 158 inwardly to accelerae the engine 18 and bring the powered trailer 10 into operational coordination and even speed and acceleration with the powered vehicle. Of course, motion of the first member 152 in a second, opposite direction relative to the second member 154 decreases the speed of the engine 18.

To slow or stop the powered trailer 10 when it is moving in the first forward direction with the powered vehicle, the brake system 125 of the powered trailer 10 is be activated by the position sensing means 150. The brake system 125 is also controlled dependent upon the position and motion of the first member 152 relative to the second member 154. The hydraulic brake actuator 134 which controls the brake system 125 of the powered trailer 10 has a piston rod 192 and a cylinder portion 194. The piston rod 192 of the brake actuator 134 is operably connected to the brake system 125 of the powered trailer 10 such that movement of the piston rod 192 into its respective cylinder portion 194 activates the brakes system 125 to limit movement of the powered trailer 10.

The cylinder portions 168 and 194 of the second actuator 164 and brake actuator 134, respectively, are sealably connected by a second hydraulic fluid connection means 196, which includes a third flow line 198 and fourth flow line 200. Thus, movement of the piston rod 166 of the second actuator 164 into its respective cylinder portion 168 forces hydraulic fluid through the third and fourth flow lines 198 and 200 to the cylinder portion 194 of the brake actuator 134 to move respective piston rod 192 away from the cylinder portion 194. This activates the brake system 125 to stop or slow the powered trailer 10. The movement of the piston rod 166 is caused by the control pin 156 moving in the second direction with the first member 152. Such motion is caused when the powered vehicle slows down, holding the first member 152 in position while the inertia of the second member 154 and powered trailer 10 cause them to be urged toward the powered vehicle. The control pin 156 pushes the piston rod 166 of the second actuator 164 inwardly to activate the brake system 125 and bring the powered trailer 10 into operational coordination and even speed and deceleration with the powered vehicle.

Spring or bias means 202 are provided for constantly urging the piston rod 192 of the brake actuator 134 toward its respective cylinder portion 194 (so that the brake system 125 is normally in an unactivated state). The bias means 202 pushes the piston rod 192 in direction best shown by arrow 204 in FIGS. 7 and 8. The brake system 125 is activated only when the force of the hydraulic fluid on the cylinder portion 194 of the brake actuator 134 overcomes the urging force of the bias means 202 on the piston rod 192. Thus, unless the brake actuator 134 is activated sufficiently to overcome the urging force of the bias means 202, the powered trailer 10 will move freely.

The carburetor actuator 144 is provided with a fluid pressure bias means 206 for constantly urging its piston rod 182 in a selected direction. Preferably, the pressure bias means 206 urges the piston rod 182 away from its respective cylinder portion 184 so that the engine 18 accelerates only when the force of the hydraulic fluid on the cylinder portion 184 of the carburetor actuator 144 overcomes the urging force of the pressure bias means 206. The pressure bias means 206 also acts as a damper to limit excessive movement of the control pin 156 during operation to prevent needless acceleration and deceleration of the engine 18.

As shown in FIGS. 7 and 8, the carburetor actuator 144 is a double-acting hydraulic actuator, with its cylinder portion 184 having a piston rod retraction chamber 210 and a separate piston rod extension chamber 212. The second flow line 190 of the first fluid connection means 186 is sealably connected to the piston rod retraction chamber 210. One end of a third fluid connection means 214 is sealably connected to the piston rod extension chamber 212 of the carburetor actuator 144, with the other end being connected to a hydraulic fluid reservoir 216. The amount of pressure of the hydraulic fluid in the reservoir 216, third fluid connection means 214 and piston rod extension chamber 212 is controlled by varying the pressure in an upper compressed air portion 218 of the reservoir 216. A pressure valve 220 is connected to the air pressure portion 218 of the reservoir 216 so that the application or release of compressed air through the valve 220 varies the pressure of the hydraulic fluid in the reservoir 216. This regulates the force of the fluid in the piston rod extension chamber 212 acting on the piston rod 182 to urge it away from the respective cylinder portion 184. Thus, the carburetor assembly 140 is normally urged to an unaccelerated or idling position by the pressure bias means 206, rather than a throttle open acceleration position. The percentages of respective trailer load that are pulled (or pushed) by the powered vehicle and load trailer 10 can be preset by adjusting the compressed air pressure in the reservoir 216. For example, the load trailer 10 will provide a greater percentage of the pulling power if the pressure in the air pressure portion 218 is raised. Such adjustment in pulling percentage may be desirable in certain highway conditions, such as steep grades. When the summit is reached, the compressed air pressure can be reduced to attain a desired level for normal highway driving.

To accelerate the engine 18, the pressure in the piston rod retraction chamber 210 must be greater than the pressure in the piston rod extension chamber 212 (to cause movement of the piston rod 182 toward its respective cylinder portion 184). The third fluid connection means 214 includes a fifth flow line 224 and a sixth flow line 226. A variable needle valve 228 is positioned in the fifth flow line 224, and a one-way check valve 230 is positioned in the sixth flow line 226. As shown in FIGS. 7 and 8, the sixth flow line 226 is connected to the fifth flow line 224 so that the needle valve 228 and the valves 230 are in parallel, with the sixth flow line 226 being connected to the fifth flow line 224 above and below the needle valve 228. This valve arrangement prevents rapid acceleration of the engine 18 by limiting the ability of the piston rod 182 to move into the cylinder portion 184 since the flow of fluid from the piston rod extension chamber 212 to the reservoir 216 is limited by the needle valve 228. During deceleration, however, the flow of fluid from the reservoir 216 to the piston rod extension chamber 212 is unrestricted through the one-way check valve 230.

Discussion to this point has centered on the operation of the powered trailer in the first forward direction. The powered trailer 10 is provided with reverse operation means so that the engine 18 can also apply power to the wheels 30 to move the powered trailer 10 in a reverse direction (as shown generally by reverse arrow 222 in FIG. 8).

Since the acceleration of the engine 18 is based upon the motion and position of the control pin 156 relative to the hydraulic actuators 158 and 162, it is necessary to simultaneously reverse the functions of the brake system 125 and engine 18 in order to obtain controlled movement of the powered trailer 10 in the reverse direction. This is done quite simply by the use of a single hydraulic four-way valve 240. The four-way valve 240 is operably connected to both the first and second hydraulic fluid connection means 186 and 196, as shown in FIGS. 7 and 8. For controlled acceleration and braking in the forward direction, the valve 240 is positioned as shown in FIG. 7 to connect the first flow line 188 and second flow line 190 of the first hydraulic fluid connection means 186. In addition, when in this position, the valve 240 connects the third flow line 198 and fourth flow line 200 of the second hydraulic fluid connection means 196. Thus, the first actuator 158 is operably connected to the carburetor actuator 144 and the second actuator 164 is operably connected to the brake actuator 134.

For reverse operation of the powered trailer 10, the valve 240 is moved to the position as shown in FIG. 8 so that it connects the first flow line 188 to the fourth flow line 200 and connects the third flow line 198 to the second flow line 190. The first actuator 158 is now operably connected to the brake actuator 134 and the second actuator 164 is now operably connected to the carburetor actuator 144. Movement of the control pin 156 toward the first actuator 158 activates the brake system 125 of the powered trailer 10 and movement of the control pin 156 toward the second actuator 164 activates the carburetor actuator 144 to increase the speed of the engine 18. The brake system 125 and engine 18 are in complete reverse operation for moving the powered trailer 10 backwards (to the right as in FIGS. 1-5 and 9).

There is the possibility (though remote) that during operation, the powered trailer 10 may become accidentally separated from the powered vehicle. The resultant danger from having a driverless powered device pulling a load trailer on the highway is quite obvious. Thus, an emergency brake system 235 is provided on the powered trailer 10 which will automatically activate the brake system 125 if the powered trailer 10 becomes disengaged from the powered vehicle.

The emergency brake system 235 is activated by the downward pivoting of the tongue assembly 44 (to its lower brake position) that would occur if it became disengaged from the powered vehicle. A tongue hydraulic actuator 242 has a piston rod 244 and a cylinder portion 246, with the cylinder portion 246 being fixedly mounted on the main frame 20 adjacent its forward end 40. The tongue actuator 242 is positioned such that its piston rod 244 extends in direction to engage a brake trigger plate 248 mounted on the tongue assembly 44, as best shown in FIGS. 3 and 4. As the tongue assembly 44 pivots downwardly about the generally horizontal axis defined by the pivot pins 54, the trigger plate 248 contacts the piston rod 244 of the tongue actuator 242 and pushes it into its respective cylinder portion 246. The emergency brake system 235 also acts as a parking brake for the load trailer 10. When the powered vehicle is unhitched from the load trailer 10, the tongue assembly 44 drops to its lower stop position to effectively restrict any movement of the powered trailer 10.

A fourth hydraulic fluid connection means 250 sealably connects the cylinder portions 246 and 194 of the tongue actuator 242 and brake actuator 134, respectively. The fourth hydraulic fluid connection means 250 includes a seventh flow line 252 and a portion of the fourth flow line 200, as shown in FIGS. 7 and 8. Movement of the piston rod 244 of the tongue actuator 242 into its respective cylinder portion 246 causes hydraulic fluid to force the piston rod 192 of the brake actuator 134 away from its cylinder portion 194 to overcome the force of the bias means 202 and activate the brake system 125. As shown in FIGS. 7 and 8, the first actuator 158, second actuator 164, and tongue actuator 242 are normally positioned with their respective piston rods in fully extended positions. Thus, if the valve 240 is positioned for forward movement (as in FIG. 7), no pressure will be absorbed in the second actuator 164 if the tongue actuator 242 is activated. All pressure build-up goes to move the piston rod 192 of the brake actuator 134. Conversely, if the second actuator 164 is activated, all pressure build-up goes to the cylinder portion 194 of the brake actuator 134 rather than being absorbed in the tongue actuator 242. The same result is obtained when the valve 240 is placed in the reverse position (as in FIG. 8), with the operation of the second actuator 164 being assumed by the first actuator 158.

When the powered trailer 10 is to be moved by a powered vehicle without a load trailer 16 being hitched behind it, it is necessary to prevent the pivoting of the tongue assembly 44 with respect to the main frame 20. This is so because no tongue weight is placed on the rearward end 42 of the main frame 20 to maintain it in its upper operating position. Without the tongue weight of the load trailer 16 on the powered trailer, the operation of the engine 18 and brake system 125 of the powered trailer 10 will cause eccentric and uncontrolled pivoting of the main frame 20 relative to the tongue assembly 44. To prevent such movement, a bolster means 254 is selectively secured between the tongue assembly 44 and the main frame 20. The bolster means 254 maintains the tongue assembly in the upper operating position, as shown in FIG. 3. Preferably, the bolster means 254 comprises a rigid brace 256 selectively secured between an apertured ear 258 on the central portion 55 of the tongue assembly 44 and an apertured bracket 260 secured on bracket mount 262 adjacent the forward end 40 of main frame 20. The brace 256 is secured to the ear 258 and bracket 260 by suitable fasteners 264, as shown. The use of brace 256 does not limit movement of first member 152 relative to second member 154, but it does prevent the tongue assembly 44 from pivoting relative to the main frame 20 and inadvertently activating the tongue actuator 242.

Although the present invention has been described with reference to preferred embodiments, workers skilled in the art will recognize that changes may be made in form and detail without departing from the spirit and scope of the invention.

What is claimed is:

1. A load bearing powered trailer for assisting a powered vehicle in moving a load trailer, the powered trailer comprising:
    a main frame having a forward end and a rearward end;
    a pair of wheels movably supporting the main frame;
    an internal combustion engine mounted on the main frame and having a carburetor assembly operably connected thereto;
    automatic transmission means for transmitting mechanical power from the engine to the wheels;
    a tongue assembly for selectively connecting the powered trailer adjacent the forward end of its main frame to the vehicle, the tongue assmbly having a first member adapted to be connected to the vehicle and a second member connected to the powered trailer, the first member being movable in a first direction and a second, opposite direction with respect to the second member, the position and motion of the first member relative to the second member being dependent upon the position and motion of the vehicle relative to the powered trailer;
    hydraulic actuator sensing means for sensing the position and motion of the first member relative to the second member which includes:
        a control pin fixedly mounted on the first member of the tongue assembly, and
        a hydraulic sensing actuator having a piston rod and a cylinder portion, the cylinder portion of the sensing actuator being fixedly mounted on the second member of the tongue assembly with its respective piston rod extending in direction to engage the control poin so that movement of the first member in the first direction relative to the second member causes movement of the piston rod in the cylinder portion of the sensing actuator;
    hydraulic engine speed control means for controlling the speed of the engine dependent upon the position and motion sensed by the hydraulic actuator sensing means to simultaneously change the pushing and pulling power of the powered trailer in coordination with the powered vehicle the speed control means having:
        a double-acting hydraulic carburetor actuator having a piston rod and a cylinder portion, the cylinder portion thereof having a piston rod retraction chamber and a separate piston rod extension chamber, the piston rod being operably connected to the carburetor assembly such that movement of the piston rod of the carburetor actuator controls acceleration of the engine, and
        first hydraulic fluid connection means for connecting the sensing actuator and one of the chambers of the carburetor actuator so that movement of the piston rod of the sensing actuator causes movement of the piston rod of the carburetor actuator, thereby controlling engine acceleration;
    fluid pressure bias means for constantly urging the piston rod of the carburetor actuator toward a direction which opposes acceleration of the engine so that the engine accelerates when the force of the hydraulic fluid caused by movement of the piston rod of the sensing actuator in response to movement of the control pin in the first direction overcomes the urging force of the pressure bias means, the pressure bias means having:
        a hydraulic fluid reservoir,
        second fluid connection means for connecting the other chamber of the carburetor actuator and the fluid reservoir, and
        fluid pressure regulator means operably mounted on the fluid reservoir for controlling the pressure of the hydraulic fluid therein and the force of the fluid in the other chamber acting on the piston rod of the carburetor actuator; and
    hitch means for selectively connecting the powered trailer adjacent the rearward end of its main frame to the load trailer.

2. A load bearing powered trailer for assisting a powered vehicle in moving a load trailer, the powered trailer comprising:
    a main frame having a forward end and a rearward end;
    a pair of wheels movably supporting the main frame;
    an engine mounted on the main frame;
    automatic transmission means for transmitting mechanical power from the engine to the wheels;
    a tongue assembly for selectively connecting the powered trailer adjacent the forward end of its main frame to the vehicle, the tongue assembly having a first member adapted to be connected to the vehicle and a second member connected to the powered trailer, the first member being movable in a first direction and a second, opposite direction with respect to the second member, the position and motion of the first member relative to the second member being dependent upon the position and motion of the vehicle relative to the powered trailer;

sensing means for sensing the position and motion of the first member relative to the second member;

engine speed control means for controlling the speed of the engine dependent upon the position and motion sensed by the sensing means which increases the speed of the engine when motion of the first member is in the first direction relative to the second member and decreases the speed of the engine when motion of the first member is in the second direction relative to the second member;

braking means for braking the powered trailer when the sensing means senses motion of the first member in the second direction relative to the second member;

reverse operation means operably connected to the sensing means, the braking means, and the engine speed control means for selectively simultaneously reversing functions of the braking means and the engine speed control means; and hitch means for selectively connecting the powered trailer adjacent the rearward end of its main frame to the load trailer.

3. The powered trailer of claim 2 wherein the sensing means comprises:

a control pin fixedly mounted on the first member of the tongue assembly;

a first hydraulic actuator having a piston rod and a cylinder portion, the cylinder portion of the first actuator being fixedly mounted on the second member of the tongue assembly with its respective piston rod extending in direction to engage the control pin so that movement of the first member in the first direction relative to the second member causes movement of the piston rod in the cylinder portion of the first actuator; and a second hydraulic actuator having a piston rod and a cylinder portion, the cylinder portion of the second actuator being fixedly mounted on the second member of the tongue assembly with its respective piston rod extending in direction to engage the control pin so that movement of the first member slides in the second direction relative to the second member causes movement of the piston rod in the cylinder portion of the second actuator.

4. The powered trailer of claim 3 wherein the braking means comprises:

brakes operably connected to the wheels of the powered trailer;

a hydraulic brake actuator having a piston rod and a cylinder portion, the piston rod being operably connected to the brakes such that movement of the piston rod of the brake actuator in its respective cylinder portion controls application of the brakes to limit movement of the powered trailer; and second hydraulic fluid connection means for connecting the second actuator and brake actuator so that movement of the piston rod of the second actuator causes movement of the piston rod of the brake actuator, thereby controlling application of the brakes.

5. The powered trailer of claim 4 wherein the engine is an internal combustion engine having a carburetor assembly, and wherein engine speed control means comprises:

a hydraulic carburetor actuator having a piston rod and a cylinder portion, the piston rod being operably connected to the carburetor assembly such that movement of the piston rod of the carburetor actuator in its respective cylinder portion controls acceleration of the engine; and first hydraulic fluid connection means for connecting the first actuator and carburetor actuator so that movement of the piston rod of the first actuator in its respective cylinder portion causes movement of the piston rod of the carburetor actuator, thereby controlling engine acceleration.

6. The powered trailer of claim 5 wherein the reverse operation means comprises:

hydraulic four-way valve means operably connected to both the first and second hydraulic fluid connection means for simultaneously:

(a) changing the connection between the first actuator and carburetor actuator to a connection between the second actuator and carburetor actuator, and (b) changing the connection between the second actuator and brake actuator to a connection between the first actuator and brake actuator.

7. A load bearing powered trailer for assisting a powered vehicle in moving a load trailer, the powered trailer comprising:

a main frame having a forward end and a rearward end;

a pair of wheels movably supporting the main frame;

an engine mounted on the main frame;

automatic transmission means for transmitting mechanical power from the engine to the wheels;

a tongue assembly for selectively connecting the powered trailer adjacent the forward end of its main frame to the vehicle, the tongue assembly having a first member adapted to be connected to the vehicle and a second member connected to the powered trailer, the first member being movable in a first direction and a second, opposite direction with respect to the second member, the position and motion of the first member relative to the second member being dependent upon the position and motion of the vehicle relative to the powered trailer;

hydraulic actuator sensing means for sensing the position and motion of the first member relative to the second member;

hydraulic engine speed control means for controlling the speed of the engine dependent upon the position and motion sensed by the hydraulic actuator sensing means so that the hydraulic engine speed control means increases the speed of the first engine when motion of the first member is in the first direction relative to the second member and decreases the speed of the engine when motion of the first member is in the second direction relative to the second member with acceleration of the powered trailer engine moving the powered trailer generally in the first direction;

reverse operation means operably connected to the hydraulic actuator sensing means and the hydraulic engine speed control means for selectively simultaneously reversing the functional operation of the hydraulic engine speed control means so that acceleration of the powered trailer engine moves the powered trailer generally in the second direction; and hitch means for selectively connecting the powered trailer adjacent the rearward end of its main frame to the load trailer.

* * * * *

UNITED STATES PATENT AND TRADEMARK OFFICE
CERTIFICATE OF CORRECTION

PATENT NO. : 4,502,557

DATED : March 5, 1985

INVENTOR(S) : Rogers H. Anderson

It is certified that error appears in the above-identified patent and that said Letters Patent is hereby corrected as shown below:

Column 11, line 50, (Claim 1, line 14), "assmbly" should be --assembly--. Column 12, line 2, (Claim 1, line 34), "poin" should be --pin--.

Signed and Sealed this

Sixth Day of August 1985

[SEAL]

Attest:

DONALD J. QUIGG

Attesting Officer  Acting Commissioner of Patents and Trademarks